United States Patent
Merriam et al.

(10) Patent No.: US 8,665,488 B2
(45) Date of Patent: Mar. 4, 2014

(54) OPTIMAL MAPPING OF A SPATIAL PRINT INFRASTRUCTURE

(75) Inventors: Ray U. Merriam, Rochester, NY (US); Kirk Pothos, Webster, NY (US); Guillaume Bouchard, Crolles (FR)

(73) Assignee: Xerox Corporation, Norwalk, CT (US)

( * ) Notice: Subject to any disclaimer, the term of this patent is extended or adjusted under 35 U.S.C. 154(b) by 1228 days.

(21) Appl. No.: 12/488,900

(22) Filed: Jun. 22, 2009

(65) Prior Publication Data

US 2010/0324950 A1 Dec. 23, 2010

(51) Int. Cl.
G06F 15/00 (2006.01)
(52) U.S. Cl.
USPC ........... 358/1.9; 358/1.18; 358/1.15; 358/1.1; 705/7.25; 703/1; 715/764; 715/700
(58) Field of Classification Search
USPC ................. 358/1.9, 1.18, 1.15, 1.1; 705/7.25; 703/1
See application file for complete search history.

(56) References Cited

U.S. PATENT DOCUMENTS

| 5,897,629 A | 4/1999 | Shinagawa et al. |
| 2002/0188489 A1 | 12/2002 | Cheng et al. |
| 2006/0178917 A1 * | 8/2006 | Merriam et al. .................. 705/7 |

OTHER PUBLICATIONS

European Official Communication, Application No. EP 10166240.1-1238, Jan. 30, 2012, 7 pages.
E.W. Dijkstra, "A Note on Two Problems in Connexion with Graphs", In Numerische Mathematik, 1 (1959), S. 269-271.
Siu-hang Or, Kin-Hong Wong, Ying-kin Yu, Michael Ming-yuan Chang. 2005. "Highly Automatic Approach to Architectural Floor Plan Image Understanding & Model Generation", Proceedings of 10th Fall Workshop Vision, Modeling, and Visualization, pp. 25-32.
Emily Whiting. 2006. Geometric, "Topological & Semantic Analysis of Multi-Building Floor Plan Data", M.S. Thesis, MIT, Department of Architecture., May 2006.
Vachirasuk Setalaphruk, Atsushi Ueno, Izuru Kume, Yasuyuki Kono and Masatsugu Kidode. 2002. "Topological Map Generation from Simplified Map for Mobile Robot Navigation", Proceedings of the Annual Conference of JSAI2002, vol. 16. pp. 109-110.
European Search Report, Application No. EP 10166240.1-1238, Sep. 15, 2010, 7 pages.
XP007905525, Official Journal EPO, Notice from the European Patent Office Dated Oct. 1, 2007 concerning business methods, Nov. 2007, pp. 592-593.
European Official Communication, European Application No. 10166240.1-1955/2273432, Apr. 5, 2013, 11 pages.
U.S. Appl. No. 12/488,857, filed Jun. 22, 2009, Office Action Communication, Dec. 20, 2012, 15 pages.

(Continued)

*Primary Examiner* — Qian Yang
*Assistant Examiner* — Martin Mushambo
(74) *Attorney, Agent, or Firm* — Gibb & Riley, LLC (57) ABSTRACT

Disclose are embodiments for selecting an advantageous, feasible and suitable location for placing a selected printing device within a space. A mathematical formula identifies a most advantageous location for placing the selected printing device. Next, successive contour regions surrounding this most advantageous location are defined such that any inner contour region is considered more advantageous than any outer contour region. A mark representing the most advantageous location and contour lines indicating the successive contour regions are plotted onto a floor plan of the space. The edited floor plan is then evaluated (e.g., either visually by a user or automatically) to determine whether the mark overlaps any fixed shapes and/or restricted-use areas. If the mark overlaps a fixed shape or restricted-use area, a different location can be selected that is within a closest possible contour region without overlapping any other fixed shapes or restricted-use areas.

17 Claims, 6 Drawing Sheets

(56) References Cited

OTHER PUBLICATIONS

U.S. Appl. No. 12/488,857, filed Jun. 22, 2009, Notice of Allowance Communication, Jun. 10, 2013, 8 pages.

Omura Riyousuke, "Optimum Arrangement Analyzing Apparatus, Method, and Program", Oct. 14, 2004, Abstract, ip.com, JP2004289642A.

* cited by examiner

OPTIMAL MAPPING OF A SPATIAL PRINT INFRASTRUCTURE

CROSS-REFERENCE TO RELATED APPLICATIONS

This application is related to the following application filed concurrently herewith and assigned to the same Assignee, namely, Xerox Corporation, Norwalk, Conn., USA: "METHOD AND SYSTEM FOR DETERMINING A CONFIGURATION OF A DOCUMENT PRODUCTION ENVIRONMENT", U.S. application Ser. No. 12/488,857 filed Jun. 22, 2009, Issued as U.S. Pat. No. 8,559,035 on Oct. 15, 20013, the complete disclosure of which, in its entirety, is herein incorporated by reference.

BACKGROUND AND SUMMARY

Embodiments herein generally relate to printing devices (i.e., printers, printing engines, printing apparatuses, etc., including but not limited to, electrostatographic printers and copiers, bookmaking machines, facsimile machines, multi-function machines, or any other device which performs a print outputting function for any purpose) and more particularly, to a system and method for selecting printing devices and further for placing selected printing devices at optimal locations within a particular document production environment.

Generally, a printing infrastructure refers to the various printing devices contained and operating within a document production environment (e.g., an office space or building). Various tools are available for creating a customized printing infrastructure for a particular document production environment. Specifically, these tools can model a customer's current document production environment (including, but not limited to, the customer's document production requirements, the customer's current printing infrastructure and current document output) and can further make suggestions to modify the current printing infrastructure (e.g., see U.S. Patent Application Publication No. 20060178917 of Merriam et al., published on Aug. 10, 2006, assigned to Xerox Corporation, Norwalk, Conn., USA, and incorporated herein by reference). These tools can focus on selecting particular printing devices that will accommodate the customer's document production requirements, while minimizing costs. Conventionally, once printing devices are selected, the decision of where to place them within the particular document production environment is done manually. However, because the selected printing devices may provide different capabilities, have different volume constraints, support a varying number of users, etc., it can be difficult to determine the best locations for placing the printing devices within the document production environment in order to most efficiently service end user needs.

Recently, tools have been developed that not only assist with printing device selection, but also with placement. For example, the above-referenced application, U.S. Ser. No. 12/488,857 filed on Jun. 22, 2009, issued as U.S. Pat. No. 8,559,035 on Oct. 15, 2013, provides a tool that optimizes printing device selection and placement. Specifically, this tool identifies, within a given space (e.g., an office space or building), defined areas (e.g., printing hot spots) that represent groups of users and the document volumes they output by type (e.g., copy, print, scan, fax, etc) and by capability (e.g., color, finishing, security, etc.). Then, each defined area is matched with a suitable printing device. The most advantageous location for placing the selected printing device within the defined area (i.e., the optimal location, the location that will most efficiently service the needs of end users) is then determined based on a mathematical formula. However, the mathematical formula does not consider the actual physical structures (e.g., walls, staircases, elevators or other fixed and/or non-fixed features) or restricted-use areas (i.e., areas identified as being unsuitable for printing device placement either by convention, such as rest rooms, or by customer specification (e.g., particular offices, reception areas, etc.)) within the defined area. Consequently, placement of the selected printing device in the most advantageous location, as determined by the mathematical formula, may not be feasible or suitable.

In view of the foregoing, disclosed herein are embodiments of a system and an associated method that can be used to select an advantageous, feasible and suitable final location for placing a selected printing device within a given space. The embodiments can use a mathematical formula to identify a most advantageous location for placing the selected printing device. Next, successive contour regions surrounding this most advantageous location can be defined such that any inner contour region (i.e., any contour region closer to the most advantageous location) is considered more advantageous than any outer contour region. A mark representing the most advantageous location and contour lines indicating the successive contour regions can be plotted onto a floor plan of the space. The floor plan, as edited, can then be evaluated (e.g., either visually by a user or automatically) to determine whether the mark overlaps any fixed shapes and/or restricted-use areas in the floor plan. If the mark overlaps a fixed shape or restricted-use area, a final location can be selected that is different from, but within a closest possible contour region to, the most advantageous location without overlapping any other fixed shapes or restricted-use areas. Thus, the final location will be as advantageous as possible, while still being feasible and suitable.

More particularly, disclosed herein are embodiments of a printing device selection and placement system. The system embodiments can comprise at least a memory device, a processor and a floor plan plotter.

The memory device can store a digital version of a floor plan of a space (e.g., a document production environment, such as an office space or building). The floor plan can include fixed shapes (e.g., architectural components of the space or permanent fixtures within the space), restricted-use areas (e.g., rest rooms, particular offices, reception areas, etc.) and non-fixed shapes (e.g., furnishings and other movable features in the space).

The processor can select one or more printing devices for placing within the space. For example, the processor can identify a defined area within the space, can establish printing volume and capability requirements for the defined area and, for that defined area, can select one or more printing device(s) to accommodate those printing volume and capability requirements. The processor can further determine a first location within the space and, particularly, within the defined area of the space, for placing a selected printing device. This first location can be determined such that it is the most advantageous location within the defined area for placing the selected printing device. Specifically, this first location can be determined based on a mathematical formula that uses, for example, Euclidean distances or walking distances. Finally, the processor can define successive contour regions surrounding this first location. These successive contour regions can comprise at least a first contour region immediately adjacent to and surrounding the first location and a second contour region immediately adjacent to and surrounding the first contour region. Thus, the first contour region can comprise a more advantageous region for placing the printing device than the second contour region. It should be noted that the same mathematical formula used to determine the first location can be expanded and used, by the processor, to define these successive contour regions.

The floor plan plotter can be operatively connected to both the memory device and the processor. The plotter can access the floor plan from the memory device and can form, on the floor plan, a mark representing the first location for placing the printing device within the defined area of the space and also contour lines indicating the successive contour regions around the first location.

The floor plan, as edited, can then be evaluated in order to select an advantageous, feasible and suitable final location for placing the selected printing device within the defined area of the space. Evaluation of the floor plan can be performed manually or automatically. Specifically, the system embodiments can comprise a display displaying a visual representation of the floor plan with the mark and the contour lines and/or a printer outputting a printed copy of the floor plan with the mark and the contour lines. The displayed visual representation of the edited floor plan and/or the printed copy of the edited floor plan can be evaluated by a user to determine whether the mark overlaps a fixed shape or restricted-use area. If the mark overlaps a fixed shape or a restricted-use area, the user can select a second location for placing the printing device that is different from the first location and that is in a closest possible contour region to the first location without overlapping any other fixed shapes or restricted use areas in the floor plan. Additionally, the displayed visual representation of the edited floor plan and/or the printed copy of the edited floor plan can be further evaluated by the user to determine whether the mark overlaps any non-fixed shapes. If the mark overlaps a non-fixed shape, the user can determine whether the non-fixed shape or the printing device should remain at the first location and, if necessary, can select a second location for placing the selected printing device. This second location should be different from the first location and in a closest possible contour region to the first location without overlapping any fixed shapes, restricted-use areas or other non-fixed shapes in the floor plan. Additionally and/or alternatively, the system embodiments can comprise a floor plan evaluator that automatically performs these same evaluation functions.

Also disclosed herein are embodiments of an associated printing device selection and placement method. The method embodiments can comprise storing, in memory, a digital version of a floor plan of a space. The floor plan can include fixed shapes (e.g., architectural components of the space or permanent fixtures within the space), restricted-use areas (e.g., rest rooms, particular offices, reception areas, etc.) and non-fixed shapes (e.g., furnishings and other movable features in the space).

One or more printing devices can be selected, by a processor, for placing within the space. For example, a defined area within the space can be identified, the printing volume and capability requirements for the defined area can be established, and one or more printing devices can be selected to accommodate those printing volume and capability requirements.

Next, a first location for placing a selected printing device the defined area of the space can be determined, by the processor, based on a mathematical formula that uses, for example, Euclidean or walking distances.

Next, successive contour regions are defined, by the processor, such that they comprise at least a first contour region immediately adjacent to and surrounding the first location and a second contour region immediately adjacent to and surrounding the first contour region. Thus, as defined, the first contour region will be a more advantageous region for placing the selected printing device than the second contour region. It should be noted the same mathematical formula used to determine the first location can be expanded and used, by the processor, to define these successive contour regions.

Then, a mark representing the first location and contour lines indicating the successive contour regions are formed, by a floor plan plotter, on the floor plan. The floor plan, as edited, can then be evaluated in order to select an advantageous, feasible and suitable final location for placing the selected printing device within the defined area of the space. This evaluation process can be performed manually by a user or automatically by a floor plan evaluator within printing device selection and placement system.

Specifically, the method embodiments can comprise displaying, on a display, a visual representation of the edited floor plan (i.e., the floor plan with the mark and the contour lines) and/or outputting, by a printer, a printed copy of the edited floor plan. The displayed visual representation of the edited floor plan and/or the printed copy of the edited floor plan can be evaluated by a user to determine whether the mark overlaps a fixed shape or restricted-use area. If the mark overlaps a fixed shape or restricted area, the user can select a second location for placing the selected printing device that is different from the first location and that is in a closest possible contour region to the first location without overlapping any other fixed shapes or restricted-use areas in the floor plan. Additionally, the displayed visual representation of the edited floor plan and/or the printed copy of the edited floor plan can be further evaluated by the user to determine whether the mark overlaps any non-fixed shapes. If the mark overlaps a non-fixed shape, the user can determine whether the non-fixed shape or the selected printing device should remain at the first location and, if necessary, select a second location that is different from the first location. The second location should be in a closest possible contour region to the first location without overlapping any fixed shapes, restricted-use areas or other non-fixed shapes in the floor plan.

Additionally and/or alternatively, the method embodiments can comprise using a floor plan evaluation within a printing device selection and placement system to automatically perform these evaluation functions. That is, the method embodiments can comprise automatically evaluating the edited floor plan to determine whether the mark overlaps a fixed shape or a restricted use area. If the mark overlaps a fixed shape or a restricted-use area, a second location for placing the selected printing device can be automatically selected such that the second location is different from the first location and is in a closest possible contour region to the first location without overlapping any other fixed shapes in the floor plan. Optionally, the method embodiments can further comprise automatically determining whether the mark overlaps any non-fixed shapes in the floor plan. If the mark overlaps a non-fixed shape, a determination can automatically be made, based on predetermined criteria, as to whether the non-fixed shape or the selected printing device should remain at the first location and, if necessary, select a second location that is different from the first location. The second location should be in a closest possible contour region to the first location without overlapping any fixed shapes, restricted-use areas or other non-fixed shapes in the floor plan.

Finally, also disclosed herein are embodiments of a computer program product. This computer program product can comprise a computer usable medium having computer useable program code embodied therewith. The computer usable program code can be specifically configured to perform the above-described printing device selection and placement method.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, known printing device selection and placement tools, which rely on mathematical formulas, do not consider the actual physical structures (e.g., walls, staircases, elevators or other fixed and/or non-fixed features) or restricted-use areas (i.e., areas determined to be unsuitable for printing device placement, such as rest rooms, specified offices, reception areas, etc.) within a particular document production environment. Consequently, placement locations proposed by such tools, while being advantageous based on certain criteria, may not be feasible or suitable.

In view of the foregoing, disclosed herein are embodiments of a system and an associated method that can be used to select an advantageous, feasible and suitable final location for placing a selected printing device within a given space. The embodiments can use a mathematical formula to identify the most advantageous location for placing a selected printing device within a defined area of the space. Next, successive contour regions surrounding this most advantageous location can be defined such that any inner contour region (i.e., any contour region closer to the most advantageous location) is considered more advantageous than any outer contour region. A mark representing the most advantageous location and contour lines indicating the successive contour regions can be plotted onto a floor plan of the space. The floor plan, as edited, can then be evaluated (e.g., either visually by a user or automatically by a floor plan evaluator) to determine whether the mark overlaps any fixed shapes or restricted-use areas in the floor plan. If the mark overlaps a fixed shape or restricted-use area, a final location can be selected that is different from, but within a closest possible contour region to, the most advantageous location without overlapping any other fixed shapes or restricted-use areas. Thus, the final location will be as advantageous as possible, while still being feasible and suitable.

Figure 1:
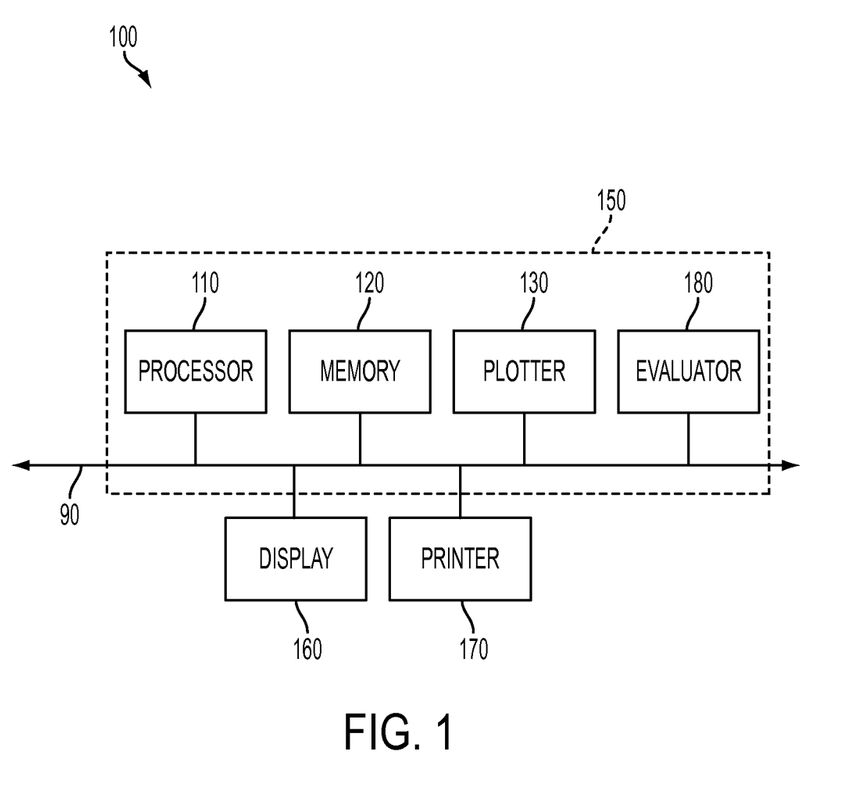
FIG. 1 is a schematic diagram of an embodiment of a printing device selection and placement system.

More particularly, referring to FIG. 1, disclosed herein are embodiments of a printing device selection and placement system 100. The system 100 embodiments can comprise at least a memory device 120, a processor 110, and a floor plan plotter 130.

The memory device 120 can store (i.e., can be adapted to store, can be configured to store, etc.) a digital version of a floor plan of a space 200 (e.g., a document production environment, such as an office space or building). This memory device 120 can comprise a random access memory (RAM), read-only memory (ROM), a hard disk, optical disk or any other suitable memory device. As illustrated in the exemplary floor plans of FIGS. 2-3, the stored floor plan can show fixed shapes 280 within the space 200. Fixed shapes, as used herein, refer to architectural components (e.g., walls, doors, stairs, etc.) and permanent fixtures (e.g., permanently installed furnishings, such as counters, cabinets, etc.). The stored floor plan can further show restricted-use spaces 290 within the space 200. Restricted-use spaces, as used herein, refer to areas determined to be unsuitable for printing device placement either by convention (e.g., rest rooms) or by customer specification (e.g., particular offices, reception areas, etc.). The stored floor plan can further show non-fixed shapes 240 within the space 200. Non-fixed shapes, as used herein, refer to shapes representing any movable furnishings and other movable features (e.g., desks, chairs, wall hangings, file cabinets, etc.).

The processor 110 can further select (i.e., can be adapted to select, can be configured to select) one or more printing devices for placing within the space 200. For example, the processor 110 can identify a defined area 202 within a space 200, establish printing volume and capability requirements for the defined area 202 and select one or more printing devices to accommodate those printing volume and capability requirements. The processor 110 can further determine (i.e., can be adapted to determine, can be configured to determine) a first location 210 within the defined area 202 of the space 200 for placing a selected printing device and, more specifically, a most advantageous location within the defined area 202 of the space 200 for placing the selected printing device. Advantageous location, as used herein, refers to an optimal location for printing device placement (i.e., a location that most efficiently services the needs of all end users).

The processor 110 can perform (i.e., can be adapted to perform, can be configured to perform) the above-described functions using, for example, a tool such as that disclosed in the above-referenced co-pending application, U.S. Ser. No. 12/488,857 filed on Jun. 22, 2009, issued as U.S. Pat. No. 8,559,035 on Oct. 15, 2013. The tool can identify, within the space, defined areas (e.g., printing hot spots) that represent groups of users and the document volumes they output by type (e.g., copy, print, scan, fax, etc) and by capability (e.g., color, finishing, security, etc.). The tool can then match each defined area 202 with suitable printing device(s). That is, the tool can establish printing volume and capability requirements for each defined area and can then select one or more printing devices specifically to accommodate those printing volume and capability requirements. The most advantageous locations for placing each one of the selected printing devices within the defined area can then be determined, for example, based on a mathematical formula.

Figure 2:
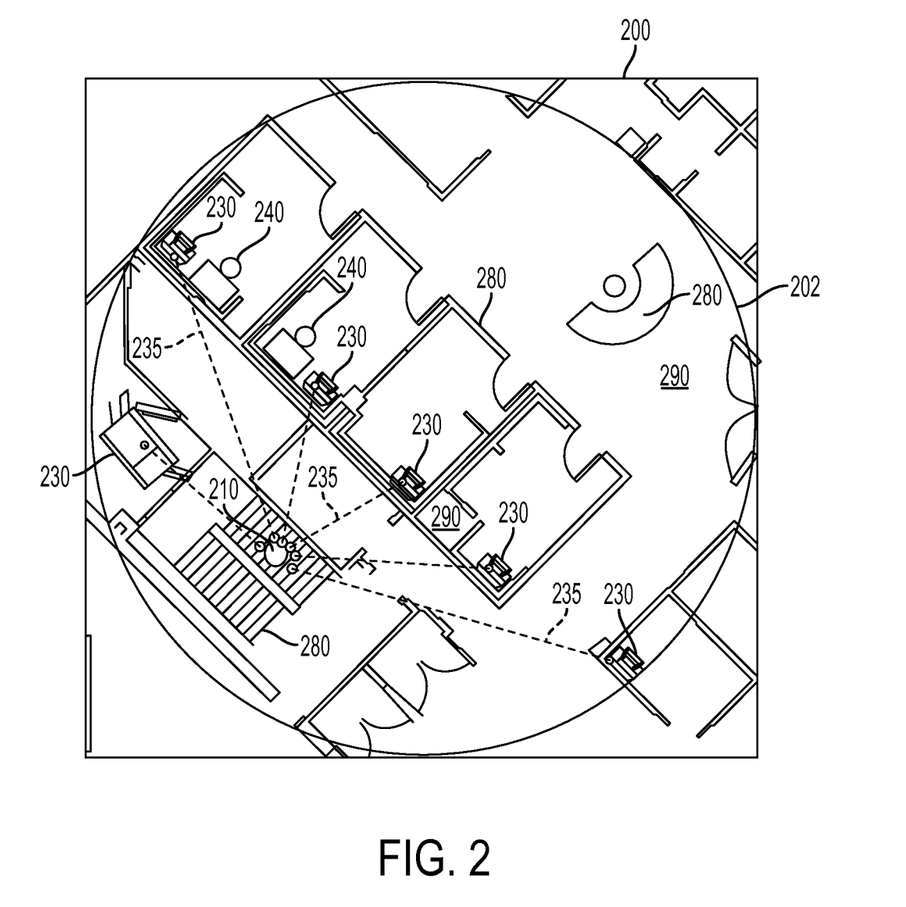
FIG. 2 is an illustration of an exemplary floor plan of a space.
Figure 3:
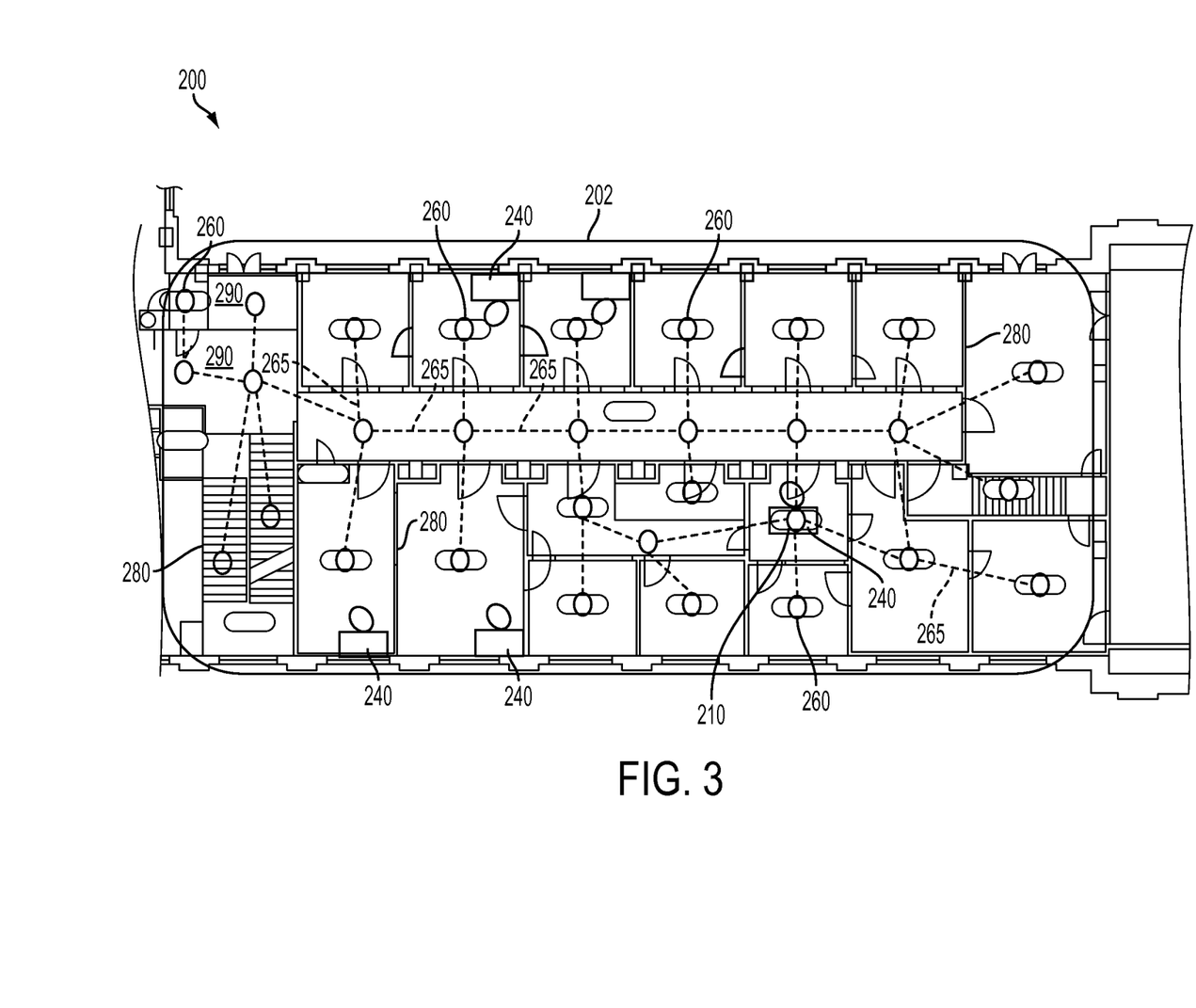
FIG. 3 is an illustration of another exemplary floor plan of a space.

This mathematical formula can, for example, use Euclidean distances 235, as illustrated in FIG. 2) (i.e., absolute distances) or walking distances 265, as illustrated in FIG. 3, to identify a specific point 210 between multiple predetermined points within the defined area 202. The predetermined points can, for example, comprise the locations 230 of current printing devices within the defined area 202, as illustrated in FIG. 2 (i.e., the locations of printing devices being replaced by the selected printing device) or other key locations 260 (e.g., user workspaces, middle of rooms, corners or ends of corridors, doors, etc.) within the defined area 202. The specific point 210 can, for example, comprise a center point between the multiple predetermined points. Alternatively, the specific point 210 can be relatively closer to one or more of the predetermined points over others, due to optional weighting.

For example, in the case, such as that illustrated in FIG. 2, where the predetermined points used to solve the mathematical formula are the locations 230 of the current printing devices that are being replaced by a selected printing device, if one of the current printing devices has higher use statistics (e.g., higher document volume) as compared to the others, that device's location may be given greater weight. It should be noted that techniques for determining Euclidean in a digital version of a map or floor plan are well-known to those of ordinary skill in the art. The details of such techniques are omitted to allow the reader to focus on the salient aspects of the embodiments described herein.

Similarly, in the case, such as that illustrated in FIG. 3, where the predetermined points used to solve the mathematical formula include the key locations 260 such as user workspaces, if one user historically prints more documents as compared to others, that user's workspace location may be given greater weight. For example, the walking distances 265 between points in a space 200 can be computed by first modeling the overall space using a weighted graph where nodes are key locations 260 (e.g., user workspaces, middle of rooms, corners or end of corridors, doors, etc.) and edges are connected to two nodes only if there is straight path without obstacle between their corresponding locations. The walking distance 265 between two nodes is then the length of the minimal path connecting them and it can be efficiently computed using an algorithm (e.g., the Dijkstra algorithm set out in E. W. Dijkstra: *A note on two problems in connexion with graphs*. In Numerische Mathematik, 1 (1959), S. 269-271.). If weighted graphs, as described above, are used to model the space 200, the first location 210 for placing a printing device as determined (i.e., computed) by the processor 110 will be located at one of the node positions. It should be noted that techniques for determining distances in a digital version of a map or floor plan are well-known to those of ordinary skill in the art (e.g., see the following documents incorporated herein by reference: Siu-hang Or, Kin-Hong Wong, Ying-kin Yu, Michael Ming-yuan Chang. 2005. Highly Automatic Approach to Architectural Floor plan Image Understanding & Model Generation, Proceedings of 10th Fall Workshop Vision, Modeling, and Visualization, pp. 25-32; Emily Whiting. 2006. Geometric, Topological & Semantic Analysis of Multi-building Floor Plan Data. M. S. Thesis, MIT, Department of Architecture, May 2006; Vachirasuk Setalaphruk, Atsushi Ueno, Izuru Kume, Yasuyuki Kono and Masatsugu Kidode. 2002. Topological Map Generation from Simplified Map for Mobile Robot Navigation. Proceedings of the Annual Conference of JSAI2002, vol. 16. pp. 109-110). The details of such techniques are omitted to allow the reader to focus on the salient aspects of the embodiments described herein.

Figure 4:
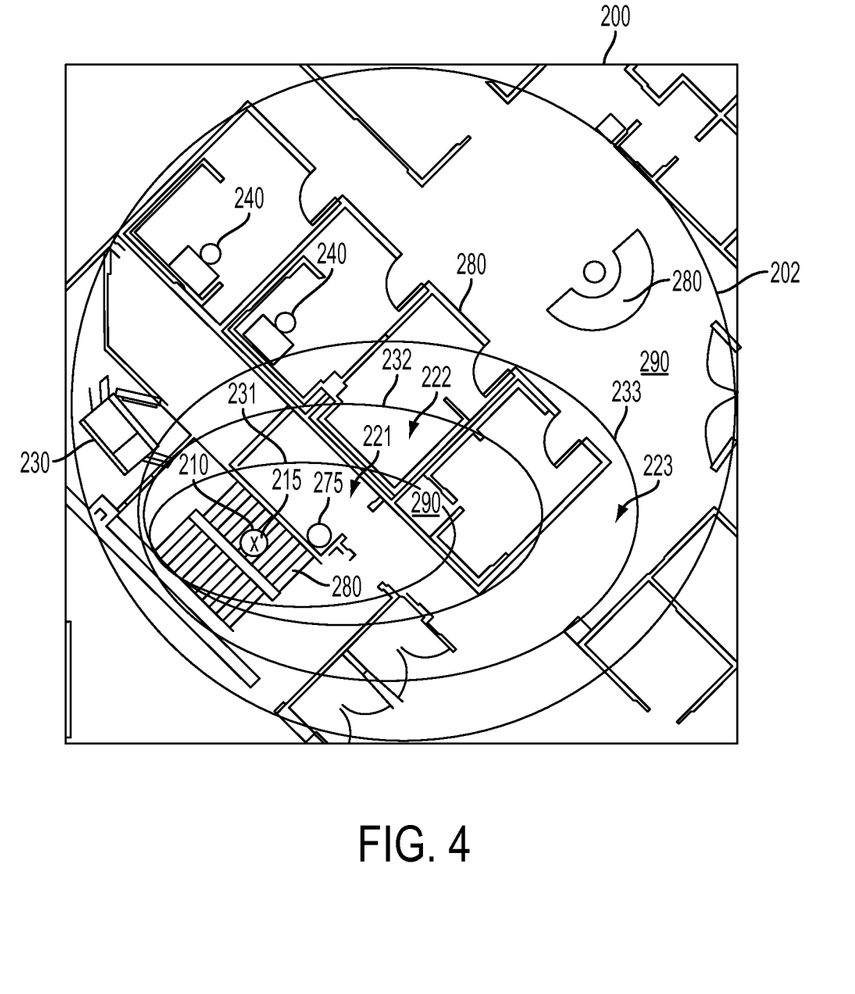
FIG. 4 is an illustration of an edited version of the exemplary floor plan of FIG. 2.
Figure 5:
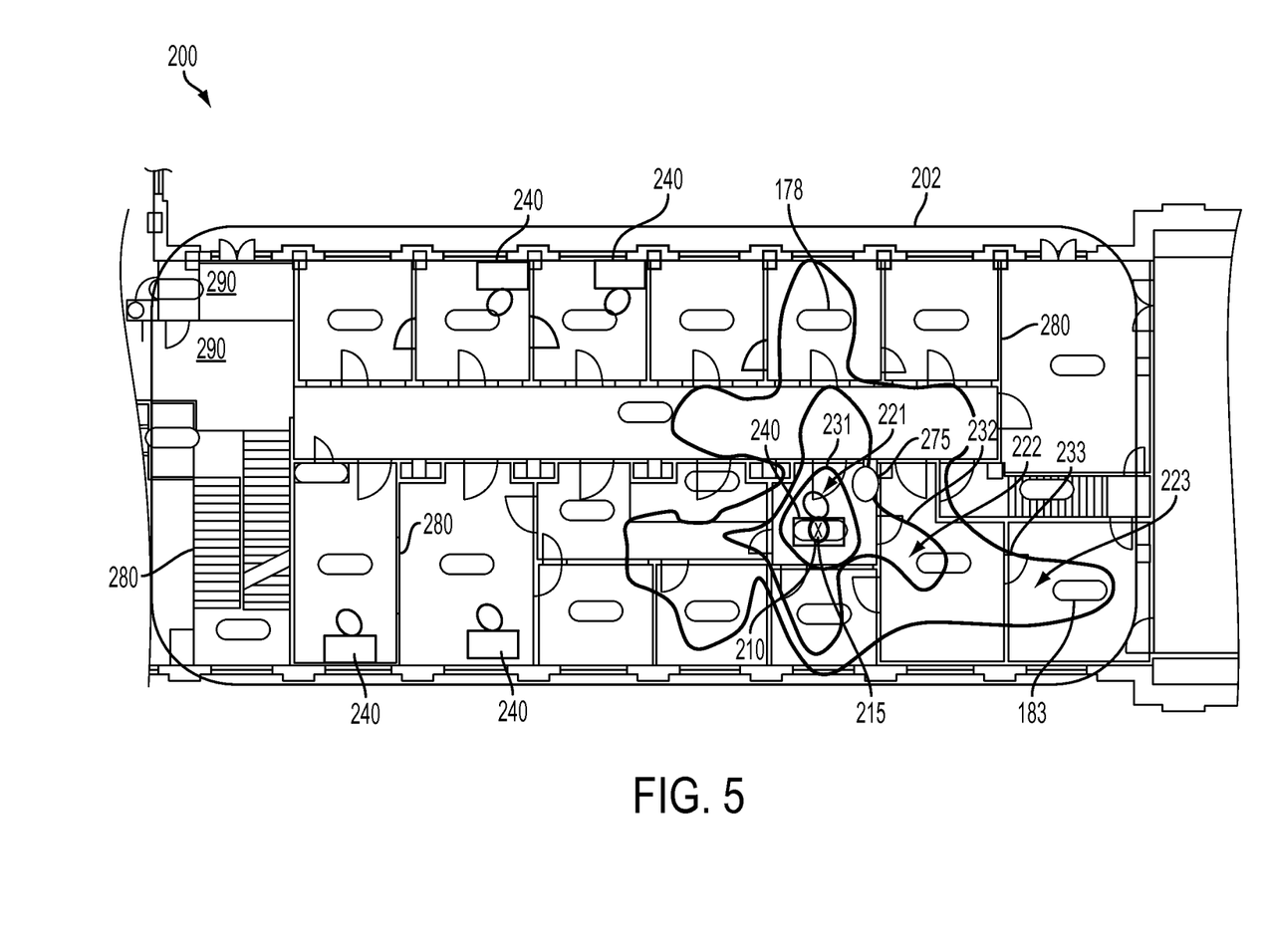
FIG. 5 is an illustration of an edited version of the exemplary floor plan of FIG. 3.

The processor 110 can further define (i.e., can be adapted to define, can be configured to define) successive contour regions 221-223 surrounding the first location 210 such that any inner contour region (i.e., any contour region closer to the first location) is considered more advantageous for printing device placement than any outer contour region. These successive contour regions 221-223 can comprise at least a first contour region 221 immediately adjacent to and surrounding the first location 210 and a second contour region 222 immediately adjacent to and surrounding the first contour region 221. Thus, the first contour region 221 can comprise a more advantageous region for placing the printing device than the second contour region 222. See FIGS. 4-5 illustrating exemplary edited floor plans, generated as described in detail below, and showing the contour regions 221-223. In their simplest forms, these successive contour regions 221-223 can comprise nested isocontours regions (i.e., same shape regions, for example, circles or ovals) that are not concentric (i.e., do not have the same center point), as illustrated in FIG. 4. However, it is anticipated that, these successive contour regions 221-223 can also comprise different shaped regions, as illustrated in FIG. 5.

It should be noted that the same mathematical formula used to determine the first location 210 can be expanded and used, by the processor 110, to define these successive contour regions 221-223. For example, as discussed above, the first location 210 for printing device placement can be determined by using a mathematical formula to identify a specific point 210 between multiple predetermined points (e.g., the locations 230 of current printing devices, as shown in FIG. 2, or other key locations 260, such as user workstations, as shown in FIG. 3) within the defined area 202. Additionally, within the mathematical formula, each predetermined point can be weighted (i.e., assigned a weight or scale). This weight or scale can be assigned, for example, based on a comparison of the use statistics imputed to the predetermined points such that a relatively higher weight or scale is assigned to a specific predetermined point if the document volume imputed to that predetermined point (e.g., if the document volume generated by the current printing device at that location or generated by a specific user at that location) is greater than that imputed to other predetermined points. The larger the weight or scale the more pull a predetermined point will have. In other words, predetermined points associated with larger printing document volumes will be assigned greater weights and will, therefore, have a greater impact on determining the first location 210 and defining the successive contour regions 221-223 surrounding the first location. As shown in FIG. 5, discussed in greater detail below, the predetermined points 183 and 178 were weighted greater than other predetermined points (i.e., were given a larger weight or scale). Therefore, the most advantageous location 210 for placing the printing device is positioned closer to points 178 and 183 over other points and similarly the successive contour regions are pulled closer to the predetermined points 178 and 183 over other points. The distance between each contour line 231-233 would be determined by the overall scale or weight. For example if there was a lot of volume in a relatively small area the contour lines 231-233 would be close to each other and close to the first location 210. Whereas if there was a small amount of volume in a relatively large area the contour lines 231-233 would be far from each other and far from the first location 210.

Referring to FIG. 1 in combination with FIGS. 4-5, the floor plan plotter 130 can be operatively connected to both the memory device 120 and the processor 110. The plotter 130 can access (i.e., can be adapted to access, can be configured to access) the floor plan of the space 200 from the memory device 120 and can further form (i.e., can be adapted to form, can be configured to form), on the floor plan of the space 200, a mark 215 representing the first location 210 and also contour lines 231-233 indicating the successive contour regions 221-223. The floor plan, as edited, can then be evaluated in order to select an advantageous, feasible and suitable final location 275 for placing the selected printing device within the defined areas 202 of the space 200. Feasible location, as used herein, refers to a practicable location for printing device placement (i.e., a location that is physically capable of being used printing device placement). Suitable location, as used herein, refers to an appropriate location for printing device placement (i.e., location that is not within a restricted-use area as determined by the customer). This evaluation process can be performed manually by a user or automatically by a system 100 component.

Specifically, the system 100 embodiments can comprise a display 160 (e.g., a monitor, a graphical user interface (GUI), etc.) displaying (i.e., adapted to display, configured to display) a visual representation of the floor plan with the mark 215 and the contour lines 231-233, as shown in FIGS. 4-5. Additionally, or alternatively, the system 100 embodiments can comprise a printer 170 outputting (i.e., adapted to output, configured to output) a printed copy of the floor plan with the mark 215 and the contour lines 231-233, as shown in FIGS. 4-5. The displayed visual representation of the edited floor plan and/or the printed copy of the edited floor plan can be evaluated by a user to determine whether the mark 215 overlaps a fixed shape 280 or a restricted-use area 290. It should be noted that fixed shapes 280 and restricted-used areas 290 can be either specifically identified on the floor plan as such or, during the evaluation process, can be visually identified by the user as such. If the mark 215 overlaps a fixed shape 280 or restricted-use area 290, the user can select a second location 275 for placing the selected printing device that is different from the first location 210 and that is in a closest possible contour region to the first location 210 without overlapping any other fixed shapes 280 or restricted-use areas 290 in the floor plan. For example, see FIG. 4 in which mark 215 overlaps stairs 280 and, therefore, final location 275 within first contour region 221 is selected for printing device placement.

Additionally, the displayed visual representation of the edited floor plan and/or the printed copy of the edited floor plan can be further evaluated by the user to determine whether the mark 215 overlaps any non-fixed shapes 240. As with the fixed shapes 280 and restricted-use areas 290, non-fixed shapes 240 can be either specifically identified on the floor plan as such or, during the evaluation process, can be visually identified by the user as such. If the mark 215 overlaps a non-fixed shape 240, the user can determine whether the non-fixed shape 240 or the printing device should remain at the first location 210 and, if necessary, can select a second location 275 for placing the printing device. This second location should be different from the first location 210 and in a closest possible contour region to the first location 210 without overlapping any fixed shapes 280, restricted-use areas 290 or other non-fixed shapes 240 in the floor plan. For example, see FIG. 5 in which mark 215 overlaps desk and chair 240 and, therefore, final location 275 within contour region 222 is selected for printing device placement.

Additionally and/or alternatively, the system 100 embodiments can comprise a floor plan evaluator 180 that automatically performs (i.e., that is adapted to automatically perform, that is configured to automatically perform) the above-described evaluation functions. That is, the floor plan evaluator 180 can automatically evaluate the edited floor plan to determine whether the mark 215 overlaps a fixed shape 280 or a restricted-use area 290. In this case, both fixed shapes 280 and restricted-use areas 290 can be specifically recognizable by the floor plan evaluator 180 as such. Again, as illustrated in FIG. 4, the mark 215 overlaps the fixed shape 280, the floor plan evaluator 180 can select a second location 275 for placing the printing device that is different from the first location 210 and that is in a closest possible contour region to the first location 210 without overlapping any other fixed shapes or restricted-use areas 290 in the floor plan. Optionally, the floor plan evaluator 180 can determine whether the mark 215 overlaps any non-fixed shapes 240 in the floor plan. As with the fixed shapes 280 and restricted-use areas 290, non-fixed shapes 240 can be specifically recognizable by the floor plan evaluator as such. Again, as illustrated in FIG. 5, if the mark 215 overlaps a non-fixed shape 240, the floor plan evaluator 180 can, based on predetermined criteria, determine whether the non-fixed shape 240 or the printing device should remain at the first location 210 and, if necessary, can select a second location 275 for placing the printing device. This second location should be different from the first location 210 and in a closest possible contour region to the first location 210 without overlapping any fixed shapes 280, restricted-use areas 290 or other non-fixed shapes 240 in the floor plan.

The above-described manual and/or automatic floor plan evaluation processes can be performed for each printing device selected for placement within each defined areas 202 of the space 200 in order to obtain a final printing infrastructure for that space 200.

The system 100, as described above and illustrated in FIG. 1, can be implemented using any one or more computer devices 150 (e.g., a desktop computer, laptop computer, a dedicated server, etc.). Computer devices 150 commonly include chip-based central processing units (CPU's), input/output devices (including graphic user interfaces (GUI)), memories, power supplies, comparators, processors, etc. and are well-known and readily available through a variety of different manufacturers (e.g., Dell Computers, Round Rock Tex., USA and Apple Computer Co., Cupertino Calif., USA). The details of computer devices 150 are omitted to allow the reader to focus on the salient aspects of the embodiments described herein. The various components of the system 100, including but not limited to the processor 110, memory 120, floor plan plotter 130, floor plan evaluator 180, display 160 and printer 170, may be operatively connected via a bus 90, as illustrated. However, it should be understood that communication between the components may be accomplished using other known techniques. For example, printer 170 may be wirelessly connected to computer device 150. Additionally, the various components may be in the form of software, hardware, or both. Furthermore, while the system 100 is shown in FIG. 1 as having separate components 110, 130 and 180, each with different processing functions, it should be understood that any two or more of these components may be combined into a single processing component and any one of these components may be divided into two or more components. While the system 100 is shown in FIG. 1 as being implemented using a single computer device 150, the various components may alternatively be maintained on more than one operatively connected computer devices 150.

Finally, the printer 170 of the system 100 can comprise any printing apparatus, such as a digital copier, bookmaking machine, facsimile machine, multi-function machine, etc. which performs a print outputting function. The printer 170 can comprise any printing engine (e.g., an electrostatographic and/or xerographic printing engine, a liquid or solid inkjet printing engine, etc.) and can be configured with any printing capability, for example, multi-color printing, monochrome print, simplex printing, duplex printing, etc. The details of such printers, printing engines, etc. are well-known by those ordinarily skilled in the art and are discussed in, for example, U.S. Pat. No. 6,032,004, the complete disclosure of which is fully incorporated herein by reference.

Figure 6:
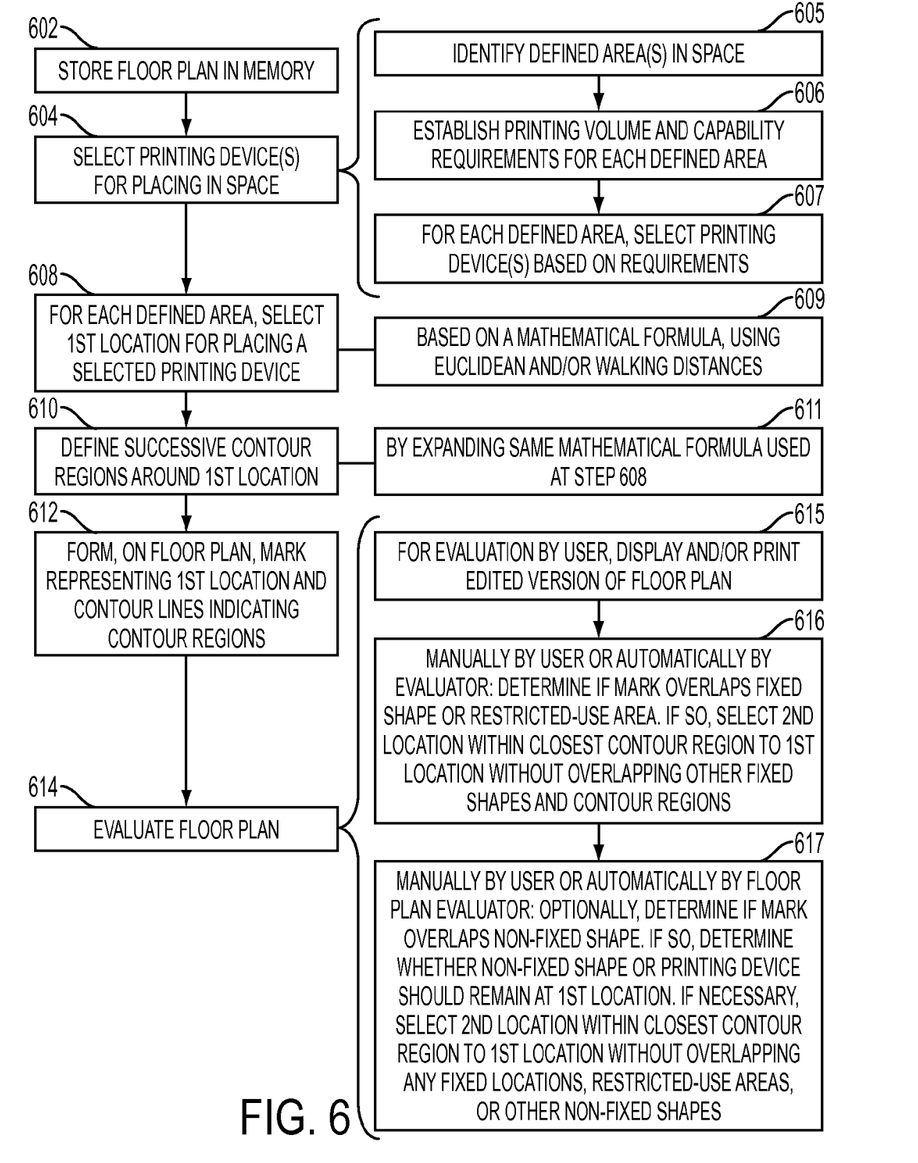
FIG. 6 is a flow diagram illustrating an embodiment of a printing device selection and placement method.

Referring to FIG. 6 in combination with FIG. 1, also disclosed herein are embodiments of an associated printing device selection and placement method. The method embodiments can comprise storing, in memory 120, a digital version of a floor plan of a space (e.g., a document production environment, such as an office space or building) (602). As illustrated in FIGS. 2-3, a floor plan of a space 200 can illustrate fixed shapes 280, restricted-use areas 290 and non-fixed shapes 240 within the space 200. Fixed shapes, as used herein, refer to architectural components (e.g., walls, doors, stairs, etc.) and permanent fixtures (e.g., permanently installed furnishings, such as counters, cabinets, etc.). Restricted-use spaces, as used herein, refer to areas determined to be unsuitable for printing device placement either by convention (e.g., rest rooms) or by customer specification (e.g., particular offices, reception areas, etc.). Non-fixed shapes, as used herein, refer to shapes representing any movable furnishings and other movable features (e.g., desks, chairs, wall hangings, file cabinets, etc.).

The method embodiments can further comprise selecting one or more printing devices for placing within the space (604). This selection process 604 can be accomplished, for example, using a tool such as that disclosed in the above-referenced co-pending application, U.S. Ser. No. 12/488,857 filed on Jun. 22, 2009, issued as U.S. Pat. No. 8,559,035 on Oct. 15, 2013, to select a printing device and to determine the most advantageous location within a space for placing the printing device. Advantageous location, as used herein, refers to an optimal location for printing device placement (i.e., a location that most efficiently services the needs of all end users).

Specifically, this selection process can comprise identifying, using a processor 110, at least one defined area 202 (e.g., a printing hot spot) within a space 200 (605, see FIGS. 2-3). This defined area 202 can represent a group of users and the document volumes they output by type (e.g., copy, print, scan, fax, etc) and by capability (e.g., color, finishing, security, etc.). The defined area 202 can then be matched, by the processor 110, with one or more suitable printing devices. That is, the processor 110 can establish the printing volume and capability requirements for the defined area 202 (606) and can then select one or more printing devices specifically to accommodate those printing volume and capability requirements (607).

Next, the method embodiments can comprise determining a first location 210 within the space 200 and, particularly, within the defined area 202, for placing a selected printing device (608, see FIGS. 2-3). This first location 210 can be determined such that it is the most advantageous location within the space 200 and, particularly, within the defined area 202 for placing the selected printing device. The process of determining the first location 210 can be performed, for example, by a processor 110 based on a mathematical formula (609). For example, the process of determining the first location 210 can use Euclidean distances (e.g., see distances 235 of FIG. 2) or walking distances (see distances 265 of FIG. 3) to identify a specific point between multiple predetermined points within the defined area. The predetermined points can, for example, comprise the locations 230 of current printing devices within the defined area 202, as illustrated in FIG. 2, (i.e., the locations of printing devices being replaced by the selected printing device) or other key locations 260 (e.g., user workspaces, middle of rooms, corners or ends of corridors, doors, etc.) within the defined area 202, as illustrated in FIG. 3. See detailed discussion above regarding how the first location 210 can be mathematically determined.

In addition to determining the first location 210 (i.e., the most advantageous location) for placing the selected printing device within the defined area 202 of the space 200, the method embodiments can further comprise defining, by the processor 110, successive contour regions 221-223 surrounding the first location 210 such that any inner contour region (i.e., any contour region closer to the first location) is considered more advantageous for printing device placement than any outer contour region (610, see FIGS. 2-3). The successive contour regions 221-223 can specifically be defined such that they comprise at least a first contour region 221 immediately adjacent to and surrounding the first location 210 and a second contour region 222 immediately adjacent to and surrounding the first contour region 221. Thus, the first contour region 221 is defined so that it is a more advantageous region for placing the printing device than the second contour region 222. In their simplest forms, these successive contour regions 221-223 can comprise nested isocontours regions (i.e., same shape regions, for example, circles or ovals) that are not concentric (i.e., do not have the same center point), as illustrated in FIG. 2. However, it is anticipated that, these successive contour regions 221-223 can also comprise different shaped regions, as illustrated in FIG. 3. As discussed in detail above, the same mathematical formula used to determine the first location can be expanded and used, by the processor 110, to define these successive contour regions 221-223 (611).

Next, the method embodiments can comprise automatically forming, by a floor plotter 130 on the floor plan, a mark 215 representing the first location 210 and contour lines 231-233 indicating the successive contour regions 221-223 (612, see FIGS. 4-5). Then, the floor plan, as edited, can be evaluated in order to select an advantageous, feasible and suitable final location 275 for placing the printing device within the defined area 202 of the space 200 (614). Feasible location, as used herein, refers to a practicable location for printing device placement (i.e., a location that is physically capable of being used printing device placement). Suitable location, as used herein, refers to an appropriate location for printing device placement (i.e., location that is not within a restricted-use area as determined by the customer). This evaluation process 614 can be performed manually by a user or automatically by a floor plan evaluator 180 component of a printing device selection and placement system 100.

Specifically, the method embodiments can comprise displaying, on a display 160, a visual representation of the edited floor plan (i.e., the floor plan with the mark and the contour lines) and/or outputting, by a printer 170, a printed copy of the edited floor plan (615). The displayed visual representation of the edited floor plan and/or the printed copy of the edited floor plan can be evaluated by a user to determine whether the mark 215 overlaps a fixed shape 280 or restricted-use area 290 (616). It should be noted that fixed shapes 280 and restricted-used areas 290 can be either specifically identified on the floor plan as such or, during the evaluation process, can be visually identified by the user as such. If the mark 215 overlaps a fixed shape 280 or a restricted-use area 290, the user can select a second location for placing the selected printing device that is different from the first location and that is in a closest possible contour region to the first location without overlapping any other fixed shapes 280 or restricted-use areas 290 in the floor plan. For example, see FIG. 4 in which mark 215 overlaps stairs 280 and, therefore, final location 275 within first contour region 221 is selected for printing device placement.

Additionally, the displayed visual representation of the edited floor plan and/or the printed copy of the edited floor plan can be further evaluated by the user to determine whether the mark overlaps any non-fixed shapes 240 (617). As with the fixed shapes 280 and restricted-use areas 290, non-fixed shapes 240 can be either specifically identified on the floor plan as such or, during the evaluation process, can be visually identified by the user as such. If the mark 215 overlaps a non-fixed shape 240, the user can determine whether the non-fixed shape 240 or the selected printing device should remain at the first location 210 and, if necessary, can select a second location 275 for placing the selected printing device. This second location 275 should be different from the first location 210 and in a closest possible contour region to the first location 210 without overlapping any fixed shapes 280, restricted-use areas 290 or other non-fixed shapes 240 in the floor plan. For example, see FIG. 5 in which mark 215 overlaps desk and chair 240 and, therefore, final location 275 within contour region 222 is selected for printing device placement.

Additionally and/or alternatively, the method embodiments can comprise using a floor plan evaluator 180 to automatically perform these functions. That is, the method embodiments can comprise using a floor plan evaluator 180 at process 616 to automatically determine whether the mark 215 overlaps a fixed shape 280 or a restricted-use area 290. In this case, both fixed shapes 280 and restricted-use areas 290 can be specifically recognizable by the floor plan evaluator 180 as such. As illustrated in FIG. 4, if the mark 215 overlaps a fixed shape 280 or a restricted-use area 290, a second location 275 for placing the selected printing device can be automatically selected such that the second location 275 is different from the first location 210 and is in a closest possible contour region to the first location 210 without overlapping any other fixed shapes 280 or restricted-use areas 290 in the floor plan. Optionally, the method embodiments can also comprise using a floor plan evaluator 180 at process 617 to automatically determine whether the mark 215 overlaps any non-fixed shapes 240 in the floor plan. As with the fixed shapes 280 and restricted use areas 290, non-fixed shapes 240 can be specifically recognizable by the floor plan evaluator 180 as such. As illustrated in FIG. 5, if the mark 215 overlaps a non-fixed shape 240, a determination can automatically be made, based on predetermined criteria, as to whether the non-fixed shape 240 or the selected printing device should remain at the first location 210 and, if necessary, a second location 275 for placing the selected printing device can automatically be selected. This second location 275 should be different from the first location 210 and in a closest possible contour region to the first location 210 without overlapping any fixed shapes 280, restricted-use areas 290 or other non-fixed shapes 240 in the floor plan.

The above-described processes 608-617 can be performed for each printing device selected, as process 604, for placement within the space 200 in order to obtain a final printing infrastructure for that space 200.

Also disclosed herein are embodiments of a computer program product. This computer program product can comprise a tangible computer-usable (i.e., computer-readable) medium on which a computer-useable (i.e., computer-readable) program code (i.e., a control program, a set of executable instructions, etc.) is recorded or embodied. Tangible computer-usable media can, for example, a memory device on which the program is recorded or, alternatively, can comprise a transmittable carrier wave in which the program is embodied as a data signal. Exemplary forms of tangible computer-usable media include, but are not limited to, floppy disks, flexible disks, hard disks, magnetic tape, any other magnetic storage medium, CD-ROM, DVD, any other optical medium, a RAM, a PROM, an EPROM, a FLASH-EPROM, any other memory chip or cartridge, transmission media (e.g., acoustic or light waves generated during radio wave or infrared data communications, respectively) or any other medium from which a computer can read and use program code. In this case, the computer-usable program code can be specifically configured to perform the above-described printing device selection and placement method. That is, the computer-usable program code can be executed by a computer in order to perform the above-described method.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

Therefore, disclosed above are embodiments of a system and an associated method that can be used to select an advantageous, feasible and suitable final location for placing a selected printing device within a given space. The embodiments can use a mathematical formula to identify a most advantageous location for placing the selected printing device. Next, successive contour regions surrounding this most advantageous location can be defined such that any inner contour region (i.e., any contour region closer to the most advantageous location) is considered more advantageous than any outer contour region. A mark representing the most advantageous location and contour lines indicating the successive contour regions can be plotted onto a floor plan of the space. The floor plan, as edited, can then be evaluated (e.g., either visually by a user or automatically) to determine whether the mark overlaps any fixed shapes and/or restricted-use areas in the floor plan. If the mark overlaps a fixed shape or restricted-use area, a final location can be selected that is different from, but within a closest possible contour region to, the most advantageous location without overlapping any other fixed shapes or restricted-use areas. Thus, the final location will be as advantageous as possible, while still being feasible and suitable.

Consequently, the system and method embodiments disclosed above recommend printing devices for a given document production environment and further take the recommended printing devices and use the spatial distance between current printing devices and/or other key locations (e.g., locations of users with the required capabilities and volume) to provide a simple interface that any user can use to assist with final printing device placement. The embodiments provide manufacturers and/or retailers a means for generating and delivering an environmentally influenced printing device selection and placement plan to customers, thereby providing for a higher level of customer satisfaction. The embodiments further enable manufacturers and/or retailers to use less experienced, lower cost employees, when responding to customer requests for such plans.

What is claimed is:

1. A printing device placement system comprising:
   a memory device storing a floor plan of a space;
   a processor determining a first location in said space for placing a printing device,
   said first location being an optimal location for placing said printing device between multiple different locations and being determined based on distances from said multiple different locations,
   said multiple different locations being current locations of multiple different printing devices being replaced by said printing device,
   said multiple different printing devices having different use statistics,
   said distances being different distances from each of said multiple different locations, said different distances being determined based on weighting of said multiple different locations, said multiple different locations being weighted based on said different use statistics for purposes of determining said optimal location such that, between a first current location of a high document volume printing device and a second current location of a low document volume printing device, said optimal location for placing said printing device will be determined to be closer to said first current location than said second current location, said processor further defining successive contour regions comprising at least:
- a first contour region immediately adjacent to and surrounding said first location; and,
- a second contour region immediately adjacent to and surrounding said first contour region,
  - said first contour region and said second contour region comprising alternative regions for possible placement of said printing device between said multiple different locations when said first location is unavailable, and
  - said first contour region comprising a more advantageous region for placing said printing device than said second contour region given said distances; and a plotter operatively connected to said memory device and said processor, said plotter forming, on said floor plan, a mark representing said first location and contour lines indicating said successive contour regions.

2. The printing device placement system of claim 1, further comprising at least one of a display displaying a visual representation of said floor plan with said mark and said contour lines and a printer outputting a printed copy of said floor plan with said mark and said contour lines so as to allow a user to perform any of the following:

determine whether said mark overlaps any one of a fixed shape and a restricted-use area in said floor plan and, if said mark overlaps said one of said fixed shape and said restricted-use area such that said first location is unavailable, select a second location for placing said printing device that is different from said first location and that is in a closest possible contour region to said first location without overlapping any other fixed shapes and restricted-use areas in said floor plan; and determine whether said mark overlaps any non-fixed shapes, and if said mark overlaps a non-fixed shape, determine which of said non-fixed shape and said printing device should remain at said first location.

3. The printing device placement system of claim 2, said fixed shapes representing at least architectural components of said space and permanent fixtures within said space and said non-fixed shapes representing any of furnishings and other movable features in said space.

4. The printing device placement system of claim 1, said first location being within a defined area of said space, said defined area having printing volume and capability requirements and said printing device being selected to accommodate said printing volume and capability requirements.

5. The printing device placement system of claim 1,
said distances from said multiple different locations comprising one of Euclidean distances and walking distances.

6. A printing device placement system comprising:
a memory device storing a floor plan of a space;
a processor determining a first location in said space for placing a printing device,
said first location being an optimal location for placing said printing device between multiple different locations and being determined based on distances from said multiple different locations, said multiple different locations being current locations of multiple different printing devices being replaced by said printing device, said multiple different printing devices having different use statistics, said distances being different distances from each of said multiple different locations, said different distances being determined based on weighting of said multiple different locations, said multiple different locations being weighted based on said different use statistics for purposes of determining said optimal location such that, between a first current location of a high document volume printing device and a second current location of a low document volume printing device, said optimal location for placing said printing device will be determined to be closer to said first current location than said second current location, said processor further defining successive contour regions comprising at least:
- a first contour region immediately adjacent to and surrounding said first location; and,
- a second contour region immediately adjacent to and surrounding said first contour region,
  - said first contour region and said second contour region comprising alternative regions for possible placement of said printing device between said multiple different locations when said first location is unavailable, and
  - said first contour region comprising a more advantageous region for placing said printing device than said second contour region given said distances;

a plotter operatively connected to said memory device and said processor, said plotter forming, on said floor plan, a mark representing said first location and contour lines indicating said successive contour regions; and, a floor plan evaluator receiving said floor plan with said mark and said contour lines from said plotter, determining whether said mark overlaps any one of a fixed shape and a restricted-use area in said floor plan such that said first location is unavailable and, if said mark overlaps said one of said fixed shape and said restricted-use area, automatically selecting a second location for placing said printing device that is different from said first location and that is in a closest possible contour region to said first location without overlapping any other fixed shapes and restricted-use areas in said floor plan.

7. The printing device placement system of claim 6, said fixed shapes representing at least architectural components of said space and permanent fixtures within said space.

8. The printing device placement system of claim 6, said floor plan evaluator further determining whether said mark overlaps any non-fixed shapes, said non-fixed shapes representing any of furnishings and other movable features in said space, and if said mark overlaps a non-fixed shape, determining which of said non-fixed shape and said printing device should remain at said first location based on predetermined criteria.

9. The printing device placement system of claim 6, said first location being within a defined area of said space, said defined area having printing volume and capability requirements and said printing device being selected to accommodate said printing volume and capability requirements.

10. The printing device placement system of claim 6,
said distances from said multiple different locations comprising one of Euclidean distances and walking distances.

11. A printing device placement method comprising:
storing, in memory, a floor plan of a space;
determining, by a processor, a first location in said space for placing a printing device, said first location being an optimal location for placing said printing device between multiple different locations and being determined based on distances from said multiple different locations,
   said multiple different locations being current locations of multiple different printing devices being replaced by said printing device,
   said multiple different printing devices having different use statistics,
   said distances being different distances from each of said multiple different locations,
   said different distances being determined based on weighting of said multiple different locations,
   said multiple different locations being weighted based on said different use statistics for purposes of determining said optimal location such that, between a first current location of a high document volume printing device and a second current location of a low document volume printing device, said optimal location for placing said printing device will be determined to be closer to said first current location than said second current location;
defining, by said processor, successive contour regions comprising at least:
   a first contour region immediately adjacent to and surrounding said first location; and,
   a second contour region immediately adjacent to and surrounding said first contour region,
   said first contour region and said second contour region comprising alternative regions for possible placement of said printing device between said multiple different locations when said first location is unavailable, and
   said first contour region comprising a more advantageous region for placing said printing device than said second contour region given said distances; and
forming, by a plotter on said floor plan, a mark representing said first location and contour lines indicating said successive contour regions.

12. The printing device placement method of claim 11, said method further comprising:
identifying a defined area of said space having printing volume and capability requirements; and,
selecting said printing device such that said printing device accommodates said printing volume and capability requirements,
said determining further comprising determining said first location such that said first location is within said defined area.

13. The printing device placement method of claim 11,
said distances from said multiple different locations comprising one of Euclidean distances and walking distances.

14. The printing device placement method of claim 11, further comprising any one displaying, on a display, and printing, by a printer, said floor plan with said mark and said contour lines, said displaying and said printing each allowing a user to determine whether said mark overlaps any one of a fixed shape and a restricted-use area in said floor plan such that said first location is unavailable and, if said mark overlaps said one of said fixed shape and said restricted-use area, to select a second location for placing said printing device that is different from said first location and that is in a closest possible contour region to said first location without overlapping any other fixed shapes and restricted-use areas in said floor plan, said fixed shapes representing at least architectural components of said space and permanent fixtures within said space.

15. The printing device placement method of claim 11, further comprising determining, by a floor plan evaluator, whether said mark overlaps any one of a fixed shape and a restricted-use area in said floor plan such that said first location is unavailable and, if said mark overlaps said one of said fixed shape and said restricted-use area, automatically selecting, by said floor plan evaluator, a second location for placing said printing device that is different from said first location and that is in a closest possible contour region to said first location without overlapping any other fixed shapes and restricted-use areas in said floor plan, said fixed shapes representing at least architectural components of said space and permanent fixtures within said space.

16. The printing device placement method of claim 11, further comprising:
determining, one of automatically by a floor plan evaluator and manually by a user, whether said mark overlaps any non-fixed shapes, said non-fixed shapes representing any of furnishings and other movable features in said space; and
if said mark overlaps a non-fixed shape, determining, one of automatically by said processor and manually by said user, which of said non-fixed shape and said printing device should remain at said first location.

17. A computer program product comprising a non-transitory computer usable medium having computer usable program code embodied therewith, said computer usable program code being configured to perform a method for placing a printing device in a space, said method comprising:
determining a first location in said space for placing a printing device, said first location being an optimal location for placing said printing device between multiple different locations and being determined based on distances from said multiple different locations,
   said multiple different locations being current locations of multiple different printing devices being replaced by said printing device,
   said multiple different printing devices having different use statistics,
   said distances being different distances from each of said multiple different locations,
   said different distances being determined based on weighting of said multiple different locations,
   said multiple different locations being weighted based on said different use statistics for purposes of determining said optimal location such that, between a first current location of a high document volume printing device and a second current location of a low document volume printing device, said optimal location for placing said printing device will be determined to be closer to said first current location than said second current location;
defining successive contour regions comprising at least:
   a first contour region immediately adjacent to and surrounding said first location; and,
   a second contour region immediately adjacent to and surrounding said first contour region,
   said first contour region and said second contour region comprising alternative regions for possible placement of said printing device between said multiple different locations when said first location is unavailable, and said first contour region comprising a more advantageous region for placing said printing device between said multiple different locations than said second contour region given said distances; and forming, on a floor plan of said space, a mark representing said first location and contour lines indicating said successive contour regions.

* * * * *